(No Model.)

T. CLEMENTS.
Trap or Valve for Safety Pipes.

No. 229,094. Patented June 22, 1880.

WITNESSES:
A. Schehl.
C. Sedgwick

INVENTOR:
T. Clements
BY Munn & Co
ATTORNEYS.

N. PETERS, PHOTO-LITHOGRAPHER, WASHINGTON, D. C.

UNITED STATES PATENT OFFICE.

THOMAS CLEMENTS, OF JERSEY CITY, NEW JERSEY.

TRAP OR VALVE FOR SAFETY-PIPES.

SPECIFICATION forming part of Letters Patent No. 229,094, dated June 22, 1880.

Application filed April 26, 1880. (No model.)

*To all whom it may concern:*

Be it known that I, THOMAS CLEMENTS, of Jersey City, in the county of Hudson and State of New Jersey, have invented a new and Improved Trap or Valve for Safety-Pipes, of which the following is a specification.

In the plumbing arrangements of houses it is common to fit a pan or safe beneath the wash-basins and water-closets to catch water from leaks and overflows, and fit such safe with a pipe to the cellar for discharging the water. Such pipes have been trapped or sealed at their lower ends by a tank of water to prevent foul or damp air from ascending; but such seal requires attention to supply water, and it is not practicable to apply a metal valve, as the pipe is seldom used and the valve rusts to its seat or becomes otherwise fixed and useless.

The object of my invention is to fit such pipes with a trap or valve which shall prevent entrance of air without preventing escape of water at any time; and my invention consists in a weighted ball, of rubber or other suitable material, fitted in a cage on a seat formed at the lower end of the safety-pipe. Such valve will remain on its seat without corrosion, so that water flowing down the pipe will readily lift the valve.

Figure 1:
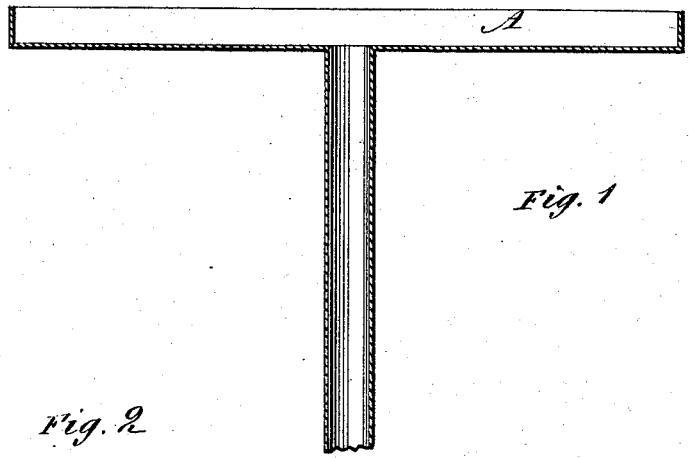
Figure 2:
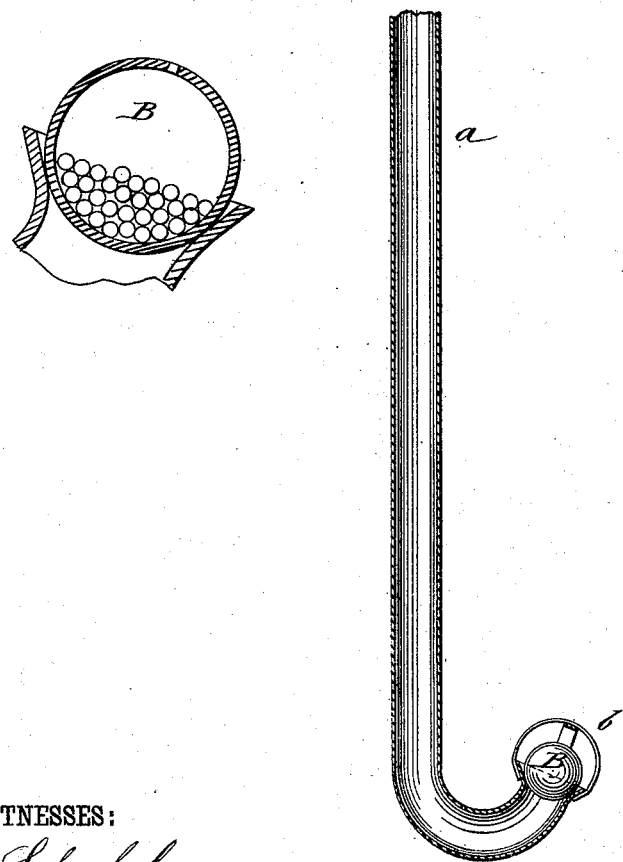

In the accompanying drawings, forming part of this specification, Figure 1 is a vertical section representing a safety-pipe fitted with my improved trapping-valve. Fig. 2 is a section of the valve in larger size.

Similar letters of reference indicate corresponding parts.

A is a pan or safe, from which the pipe $a$ descends, as usual. The lower portion of pipe $a$ is bent upward in semicircular form, and the end spread or flared, as shown, to form a seat for the ball-valve B. The end is also fitted with a cage of wires, $b$, around the valve, which retain the valve in place when raised, so that it shall return to its seat.

The valve B is preferably a ball of rubber, weighted by inserting shot or other heavy particles through the air-hole; but the same may be made of wood or other material which will not corrode or rust by the action of damp air. This ball B is retained upon its seat normally by its weight and closes or traps the end of pipe $a$, so that air may not enter. In case of leak or overflow into the safe A the water passing down the pipe $a$ will raise the valve and escape, the valve returning to its seat as soon as the pressure on it is removed.

Having thus described my invention, I claim as new and desire to secure by Letters Patent—

The trap or valve for safety-pipes, consisting of the weighted ball B, combined with the pipe $a$, that is formed with a seat and provided with wires $b$, substantially as and for the purposes set forth.

THOMAS CLEMENTS.

Witnesses:
GEO. D. WALKER,
C. SEDGWICK.